United States Patent [19]
West et al.

[11] 3,830,357
[45] Aug. 20, 1974

[54] ARTICLE RECEIVING AND HANDLING SYSTEM

[75] Inventors: Clinton L. West; Leon M. West, both of Yuba City, Calif.

[73] Assignee: Yuba City Steel Products Co., Yuba City, Calif.

[22] Filed: July 2, 1973

[21] Appl. No.: 375,642

[52] U.S. Cl..................... 198/54, 222/368, 198/103
[51] Int. Cl............................................. B65g 29/00
[58] Field of Search............ 198/29, 35, 54, 57, 58, 198/61, 103, 56, 39, 62; 222/252, 353, 360, 368, 14, 21, 59, 271, 533; 214/1 R, 2, 17 R, 17 B, 15 D

[56] References Cited
UNITED STATES PATENTS

| | | | |
|---|---|---|---|
| 983,568 | 2/1911 | Reinecue............................. | 198/62 |
| 1,183,797 | 5/1916 | Carpenter............................. | 214/2 |
| 2,886,216 | 5/1959 | Öholm............................ | 222/368 X |

Primary Examiner—Frank E. Werner
Attorney, Agent, or Firm—Lothrop & West

[57] ABSTRACT

An article receiving and handling system includes a frame on which a conveyor belt is mounted to operate with the upper run of the conveyor belt disposed horizontally and traveling in one direction. Above the belt on the frame is a metering device including a rotor having spaced, radial vanes defining compartments and arranged to rotate about an axis parallel to the belt and extending in the same direction, the rotor being about as long as the upper run of the belt. On the belt are triggering devices spaced apart a predetermined distance and activating a responsive device on the frame to control the drive of the rotor. For each actuation, the rotor turns through a partial rotation to dump one compartment full of articles onto the belt. The articles, approximately of predetermined dimensions, are initially received in a hopper disposed above and converging downwardly toward the rotor. One of the hopper walls meets an arcuate housing concentric with the rotor and laterally enclosing but one of the compartments. The other hopper wall ends at a point approximately above the rotor axis and spaced above the rotor a distance equal to several times the predetermined article dimension. Articles resting on the rotor and extending up to the hopper have an unconfined side lying substantially at the natural angle of repose.

6 Claims, 3 Drawing Figures

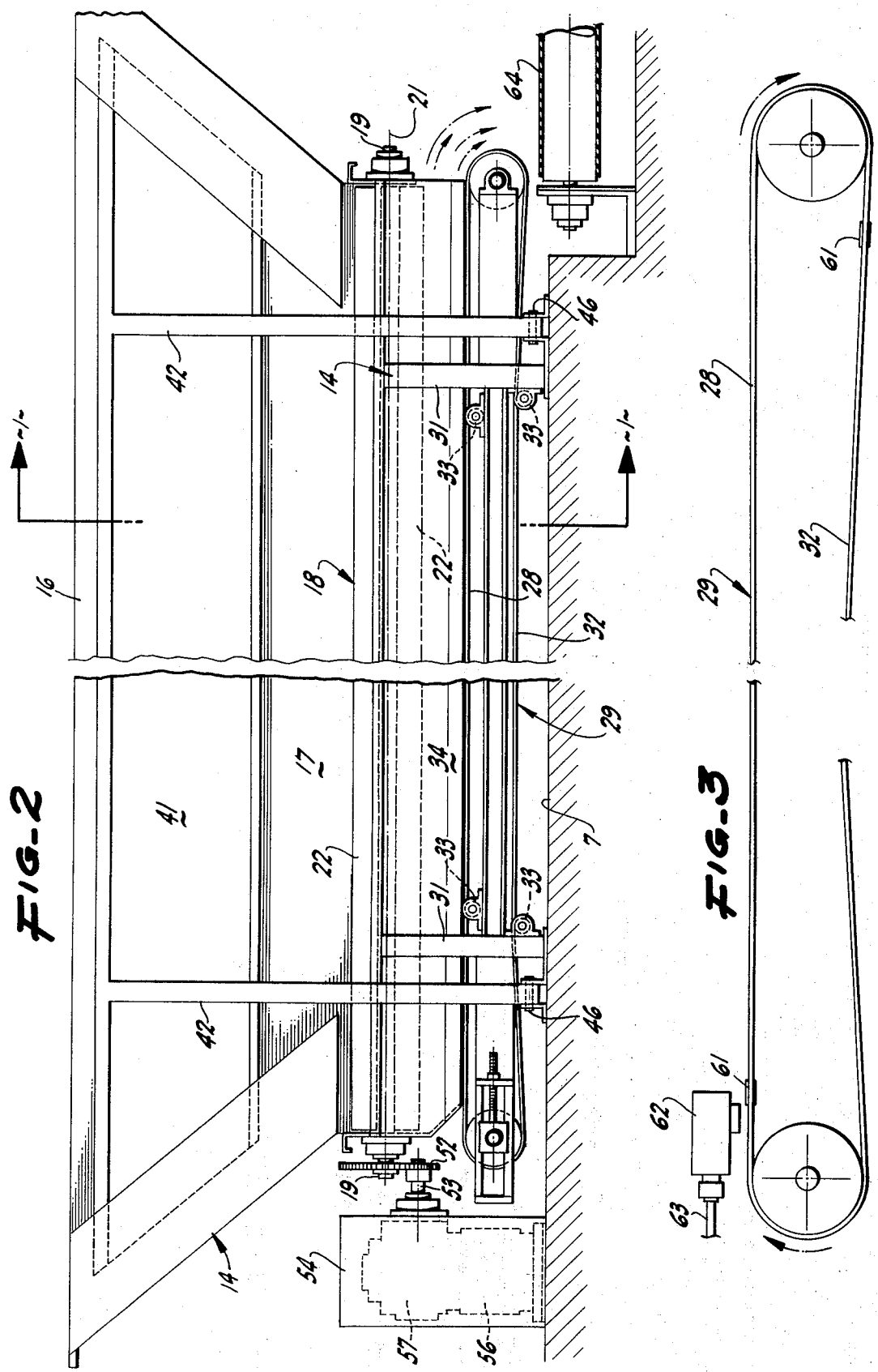

3,830,357

ARTICLE RECEIVING AND HANDLING SYSTEM

In the handling of various fungible articles, for example, field produce of the nature of cucumbers, there is considerable difficulty in automatically or mechanically handling a large mass of the material quickly without excessive bruising or other damage. Cucumbers are irregular in shape and size yet conform generally to a pattern within relatively well-known limits so that their characteristics are reasonably constant. It is desirable to handle a mass of cucumbers fresh from the field in such a way that they are as nearly as possible out of contact with sharp surfaces or edges and are not moved rapidly or abruptly against restraining walls but are generally left reasonably free. It has been determined that cucumbers can be piled to an acceptable height or depth and that when so piled they assume a relatively constant or fixed angle of repose or at least an angle of repose variable within narrow limits.

It is therefore an object of the invention to provide an article receiving and handling system in which the articles are rapidly and gently handled in large quantities, with the articles not rigidly confined or directed abruptly against confining surfaces but gently transferred from one location to another throughout the system.

Another object of the invention is to provide an article receiving and handling system effective to advance discrete quantities of articles for virtually continuous travel through the system.

A further object of the invention is to provide an article receiving and handling system effective to meter the articles in a gentle, non-damaging fashion.

It is still a further object of the invention to separate and deliver fungible articles, such as cucumbers, from a mass replenished at intervals, as by a truck, in a reliable, uniform and gentle manner, and at a controllable rate.

Another object of the invention is in general to provide an improved article receiving and handling system.

Other objects, together with the foregoing, are attained in the embodiment of the invention described in the accompanying description and illustrated in the accompanying drawings, in which:

FIG. 2 is a side elevation, portions being broken away, of the structure of FIG. 1; and FIG. 3 is an enlarged view comparable to FIG. 2, with various parts being omitted and other portions being broken away, showing part of the conveyor belt and sensing mechanism.

Figure 1:
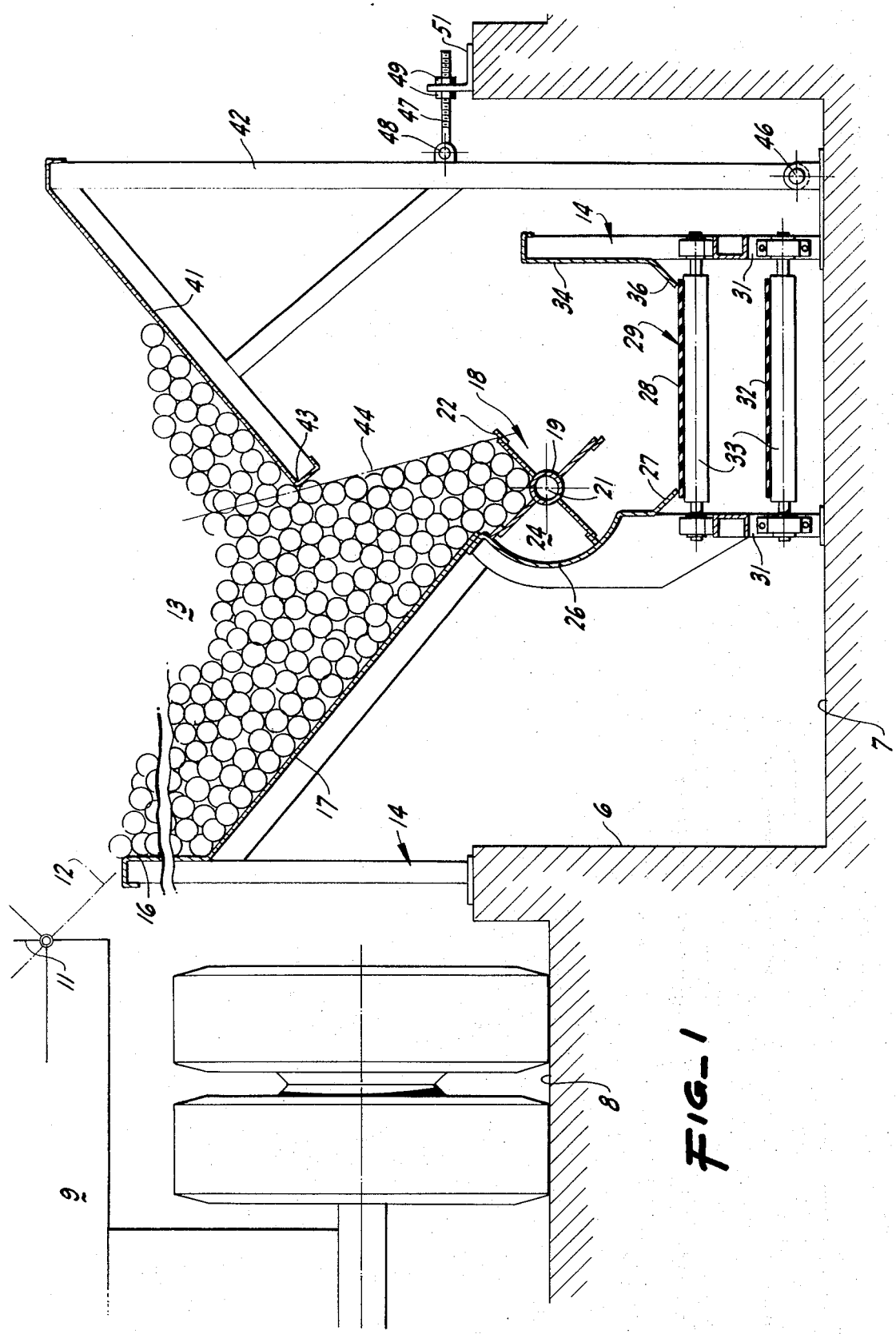
FIG. 1 is a partially diagrammatic cross-section or a vertical transverse plane through a mechanism included in the article receiving and handling system and illustrating, with portions broken away, a part of a truck dumping structure by means of which the articles are brought in for handling.

While the system of the invention can be embodied in a large number of different ways and can be utilized with many sorts of fungible items, it has been particularly designed, as disclosed herein, for operation with cucumbers as harvested in the field and for their first handling in a processing establishment.

In the usual instance the system is installed in a packing house represented by a foundation wall 6 and a floor 7 adjacent a roadway 8 on which a conveying truck 9 is stationed. The truck receives a load of cucumbers from the field and delivers them to the station, as shown, and when in position releases a truck body side wall 11 into the dotted line position 12 in FIG. 1. The tipped truck body discharges the lading transversely or laterally over the wall 6. The cucumbers being discharged are initially received in a hopper 13 supported on a frame 14 having various parts related to each other for the system as a whole.

The hopper 13 is partly defined by a vertical side wall 16 and a first inclined wall 17 which extends downwardly and away from the wall 16 toward a metering device, generally designated 18. The metering device includes a rotor 19 suitably supported and rotatable about a horizontally extending central axis 21 and likewise includes a plurality of radially disposed vanes 22, there being four of such vanes in this instance establishing by their spacing individual compartments, such as 24, between adjacent vanes. The rotor is partially confined by an arcuate housing wall 26 acting as a continuation of the wall 17 and itself being continued onto a guiding wall 27. The wall 26 substantially closes but one compartment.

The guiding wall 27 is disposed just above and extends along the upper run 28 of a conveyor belt 29 mounted for rotation on portions 31 of the frame 14. The return run 32 lies just beneath the upper run 28 and has suitable auxiliary support rollers 33 (FIG. 2) to maintain its location. The upper run 28 is partially enclosed or confined by a barrier wall 34 mounted on a portion of the frame 14 and having an inwardly directed guiding wall 36 comparable to the wall 27.

The hopper 13 is also defined by a second wall 41 arranged on a subframe 42 forming part of the main frame 14. The second wall 41 is inclined inwardly and downwardly. The walls 17 and 41 tend to converge. The wall 41 in the particular embodiment shown in FIG. 1 terminates at a point 43 or line disposed approximately over the rotor axis 21 and at a distance above the rotor or metering device many times the predetermined or known dimensions of the articles being handled. Placement of the point 43 will vary, however, depending on the size and the angle of repose, or angle of internal friction, of the articles.

When the hopper 13 is filled or partially filled the articles in resting upon each other are lightly supported and can flow easily around the lower end of the second wall 41 to rest upon the rotor 19. When they do this the articles establish a boundary surface 44 represented by an imaginary plane or line drawn between the point 43 and a vane 22 momentarily remote from the wall 17. The imaginary surface 44 is disposed approximately at or slightly more than the natural angle of repose of the articles. In the embodiment shown in FIG. 1 the slope of the surface 44 is considerably steeper than customary, the angle being exaggerated so as to emphasize the free surface concept. This arrangement makes it possible to have articles resting on the metering device yet not cramped between or confined between or abutting against a pair of side walls, there being none between the point 43 and the extended vane 22. Thus, the fungible articles rest naturally and normally at their angle of repose without transverse loading or pressure.

The point 43 (or line) is variable depending upon the commodity being handled, although only within a relatively narrow range. It is desired, therefore, to provide a setting so that the point 43 can be positioned accurately for whatever particular articles are being handled at any one time. The angle of the line 44 can be shifted within reasonable limits to correspond to the particular angle of repose. To that end the subframe 42 is supported on the foundation through a pivot connection 46. The subframe 42 can tilt about the pivot axis, being temporarily held in any selected position by a threaded connector 47. This is joined by a pivot pin 48 to the subframe 42 and has lock nuts 49 anchoring the connector 47 to a bracket 51 mounted on the frame 14 or on a convenient part of the building. In this way, by adjusting the nuts 49, the point 43 can be shifted to the left or to the right in FIG. 1.

In practice, the location of the point 43 is initially determined by nearly closing the throat between the point 43 and the vane 22 (bearing in mind that the extent of the opening, or throat, in FIG. 1 is exaggerated for the effect) and then filling the hopper with the article. Then, by slowly opening the throat by moving point 43 away from the vane 22, the optimum opening is arrived at when the articles feed well as the system is operating. Experience quickly enables the operator to determine this point.

For operating the device, as particularly shown in FIG. 2, the shaft of the rotor 19 can be connected through gearing 52 with a shaft 53 extending from an appropriate drive housing 54. In some installations it is preferable to eliminate gearing 52 and use a direct drive.

The drive housing conveniently encloses a drive motor 56 and a Geneva drive 57, or mechanism. When the motor 56 is energized, the Geneva mechanism 57 is effective to rotate the rotor 19 through one quarter turn and then holds or locks the rotor in the new, turned position. The effect of this is for the rotor to be held stationary for a time with the upper, adjacent vanes 22 in a V-position while it is loaded, as shown in FIG. 1, from the hopper 13. Thereafter, when the motor 56 is energized the rotor 19 turns a quarter turn clockwise and discharges a compartment 24 full of articles from the rotor onto the subjacent upper run 28 of the conveyor belt. Since the angle of repose is within the established confines of the point 43 and of an extended rotor vane, there is no spill over or excess transfer of articles from the hopper onto the belt. The articles are not bruised by confinement nor by their gentle fall.

As soon as one of the compartments 24 has discharged its load of articles, the upper run 28 of the belt for substantially its entire length is occupied. This is because the length of the rotor 19 is approximately the same as the length of the upper run 28. The belt 29 is properly driven by any appropriate means, not shown, and is utilized as a particular controlling or timing device for regulating the operation of the rotor 19.

To that end, as shown particularly in FIG. 3, the belt is provided with triggering devices 61. In the present instance these triggering devices are bodies, such as steel or iron, having an electromagnetic effect. They are spaced apart, when measured along the length of the belt, a distance which is a predetermined distance substantially the same as the distance along the outlet of the metering device 18 or rotor 19. Cooperating with the triggering devices 61 is a responsive device 62 or pick-up usually of an electromagnetic nature and having an electrical connection 63 to the drive motor 56 of the metering device 18.

As the belt 29 advances in the direction of the arrows in FIG. 3, each time one of the triggering devices 61 gets close to the pick-up or responsive device 62, the drive motor 56 is energized and through the Geneva mechanism rotates the rotor 19 one quarter turn.

The fungible articles in the hopper 13 are discharged in discrete amounts equal to the load of a single compartment 24. The compartments 24 unload one at a time onto the subjacent belt 28. Each discharge extends for substantially the entire length of the upper run of the belt which is about the same as the distance between the triggering devices 61. As the loaded belt advances each compartment load of articles is discharged over the far end of the belt, for example, onto a receiving conveyor 64. The next triggering device 61 is then in position again to actuate the motor 56 by energizing the sensing device 62. The clear, subjacent upper run 28 of the belt is then itself simultaneously loaded with the articles contained in the next successive pocket or compartment 24 in the metering device. Should the belt 29 at any time be stopped, the rotor 19 remains in position and the article discharge therefrom is interrupted. The belt 29 is driven by a variable speed device so that the output rate of the system is controllable over a wide range.

In this fashion a bulk load of randomly arranged articles, such as cucumbers, is gently received in a hopper and is released therefrom in measured amounts and without jostling or confinement and onto a belt which is effective to time the release of the articles so that the belt is equally loaded along its length and gently conveys the articles to a conveyor 64 for further handling.

What is claimed is:

1. An article receiving and handling system comprising:
   a. a frame;
   b. a conveyor belt on said frame;
   c. an article receiving hopper on said frame above said belt;
   d. a metering device interposed between said hopper and said belt, said metering device including a rotor having vanes dividing said rotor into compartments, and including an arcuate housing concentric with said rotor and having an arcuate extent to enclose only one of said compartments at a time;
   e. means for driving said metering device intermittently;
   f. means for advancing said belt; and,
   g. means dependent upon the relative advanced conveying position of said belt on said frame for controlling said driving means,
      said hopper being at least in part defined by a first wall extending to said rotor and by a second wall extending to and ending at a point above said rotor;
      an imaginary line from said point to the extremity of one of said vanes in a position remote from said first wall being substantially at the angle of repose of said articles in said hopper and resting on said rotor.

2. A system as in claim 1 in which said articles have a predetermined dimension and said point is above said rotor a distance several times said predetermined dimension.

3. A system as in claim 1 including a triggering device on and traveling with said belt, means on said frame responsive to said triggering device, and means controlled by said responsive means for operating said driving means.

4. A system as in claim 1 in which said conveyor belt is disposed with an upper horizontal run, said metering device includes a rotor symmetrical about an axis parallel to and extending along said upper run, triggering devices are disposed on said belt at a predetermined distance apart, said rotor has a length of about said predetermined distance, and means responsive to said triggering devices control said driving means.

5. A system as in claim 1 including means for moving said second wall to shift said point relative to said rotor.

6. An article receiving and handling system comprising:
   a. a frame;
   b. a conveyor belt on said frame;
   c. an article receiving hopper on said frame;
   d. a metering device interposed between said hopper and said belt, said metering device including a rotor having vanes dividing said rotor into compartments, said hopper being at least in part defined by a first wall extending into close juxtaposition to the extremity of the adjacent one of said vanes and by a second wall extending to and ending at a point above said rotor, an imaginary line from said point to the extremity of the next preceding one of said vanes in the direction of rotation of said rotor and remote from said first wall being substantially at the angle of repose of said articles in said hopper and resting on said rotor in the compartment defined by said one of said vanes and said next preceding one of said vanes;
   e. means for driving said metering device intermittently to advance only one of said compartments at a time;
   f. means for advancing said belt; and
   g. means dependent upon the relative advanced conveying position of said belt on said frame for controlling said driving means.

* * * * *